Dec. 22, 1970   J. F. MOSS   3,549,735

EXTRUSION APPARATUS AND METHOD

Filed March 25, 1968

INVENTOR.
JOHN F. MOSS
BY Philip M. Rice
& W. A. Schaich
ATTORNEYS

United States Patent Office 3,549,735
Patented Dec. 22, 1970

3,549,735
EXTRUSION APPARATUS AND METHOD
John F. Moss, College Park, Ga., assignor to Owens-Illinois, Inc., a corporation of Ohio
Filed Mar. 25, 1968, Ser. No. 715,635
Int. Cl. B29c 17/07; B29d 3/02
U.S. Cl. 264—39      2 Claims

ABSTRACT OF THE DISCLOSURE

A method of maintaining uniform dispersion of colorant pigments in heated thermoplastic material is disclosed wherein plasticized material containing metallic or pearlescent pigment is extruded through a die passage having grit blasted surfaces provided by grit blasting with a grit between 60 and 80 mesh and setting the pigmented material while maintaining the desired uniform pigment dispersion.

SUMMARY OF THE INVENTION

It has been customary in the manufacture of plastic articles from heated thermoplastic materials to make as smooth as possible the channels or passages through which heated thermoplastic material is directed. Normally, these passages are coated with a highly polished chrome surface. Although passages conforming to the foregoing have been generally satisfactory for most thermoplastic materials, problems were encountered when attempts were made to disperse metallic pigments in the thermoplastic material. More particularly, when attempts were made to blow mold bottles or other hollow plastic articles having copper, gold or other metallic pigment, the bottles as formed had unsightly streaks which indicated a non-uniform dispersion of the metallic pigment and which rendered the bottles commercially unacceptable.

After many attempts were made to solve the problem of streaking, it was found, surprisingly, that roughening the surfaces of the channels in the extrusion die head through which the plasticized material is extruded resulted in a more uniform dispersal of color in the finished artcile than was previously possible.

Preferably, substantially all surfaces of the die head from the entrance to the outlet orifice with which the heated and plasticized thermoplastic material comes into contact are roughened, as by grit blasting; however, it has been discovered that satisfactory results can be obtained simply by roughening or grit blasting the surfaces of those elements immediately adjacent to the outlet orifice, namely the orifice bushing and the tip of the mandrel. The best results have been obtained when the roughening is done by blasting with a 60 to 80 grit, in other words, a grid capable of passing through a 60 mesh or 80 mesh screen. Attempts have been made to use an extrusion die roughened with a grit material capable of passing through a 40 mesh screen; however, tests indicated such size grit material to be too coarse as, upon grit blasting, it produced a surface having excessive roughness. As a result of such excessive roughness, small particles of colorant material tended to adhere to the walls of the passage and cause streaking. Thus, it appears on the one hand, that if the walls of the passages are too rough, particles or colorant material will become adhered thereto causing streaking and, on the other hand, that such particles of colorant material will adhere to the highly polished chrome walls previously utilized, also causing streaking. And yet, surprisingly, the problem of streaking was overcome by utilizing an extrusion head in which the surfaces defining passages were roughened by grit blasting with a 60 mesh or finer grit.

Accordingly, it is an object of the present invention to provide an improved extrusion die head for heated thermoplastic material.

Another object of this invention is to provide an improved method for maintaining uniform dispersion of metallic or pearlescent colorant pigments in plasticized material during extrusion of such material from an extrusion die orifice.

A further understanding of this invention may be had from the following description taken in conjunction with the annexed sheet of drawings on which:

Figure 1:
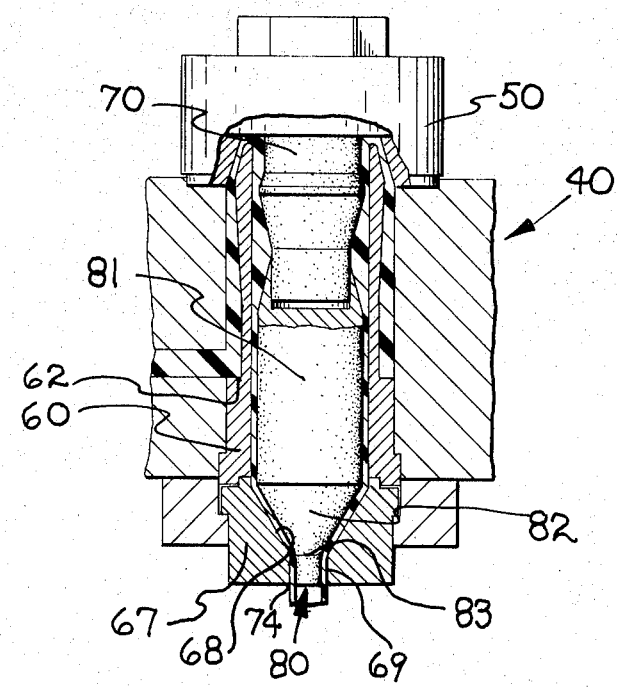
FIG. 1 is a sectional view of an extrusion head showing the surfaces thereof defining extrusion passages as being roughened by grit blasting.
Figure 2:
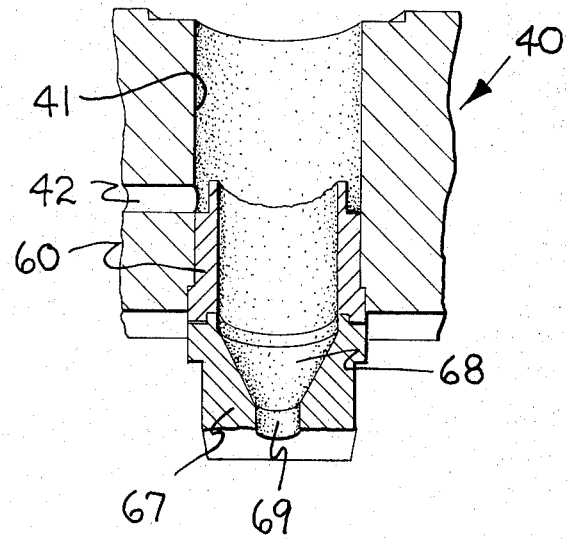
FIG. 2 is a view similar to FIG. 1 but showing some of the parts removed from the extrusion head for purposes of clarity.

Although the present invention may be utilized with any one of several die heads or orifice structures, it will be described as utilized on an orifice structure of the type described in U.S. Pat. No. 3,090,994 which is assigned to the assignee of the present invention and which disclosure is incorporated herein by reference.

Referring now to the drawings, there is illustrated an orifice block 40 in which is provided a vertical extending bore 41 and in anlet passage 42 communicating with an extender or other source of plasticized material. It will be appreciated from reference to U.S. Pat. No. 3,090,994 that a plurality of bores 41 could be provided; however, in the interest of pin pointing the inventive feature of the present invention, it will be described as having but a single bore 41. Also, in the interest of clarity, it will be described as freely extruding tubing downwardly and not in combination with means for drawing the tubing upwardly as set forth in such patent.

Positioned in the bore 41 is an orifice sleeve 60. The sleeve has a substantially cylindrical configuration and is snugly received within the bore 41. The sleeve 60 is recessed as at 62 to direct the flow of heated thermoplastic material initially in a direction opposite from the outlet orifice.

Secured to the end of the orifice block is a mandrel support block 50 from which extends a mandrel 70. Superimposed upon the mandrel 70 is an auxiliary mandrel element 80. The mandrel 70 and auxiliary mandrel element 80 are thus supported within the sleeve 60 and in spaced relationship therewith to define an annular passageway for directing the flow of heated thermoplastic material.

The auxiliary mandrel element 80 has a major cylindrical portion 81 and terminates at its free end in a frusto-conical segment 82 and a short cylindrical tip 83.

Abutting the end of the sleeve 60 is an outlet block 67 having an interior surface 68 tapered for a parallel configuration to the frusto-conical segment 82 of the auxiliary mandrel element 80. The interior surface of the outlet block 67 terminates in a short cylindrical portion 69 which is parallel to the cylindrical tip 83 of the element 80 and cooperates therewith to define an annular orifice 74.

Preferably, all portions of the bore 41, sleeve 60, mandrel 70, auxiliary mandrel element 80 and outlet block 67 are roughened by grit blasting with a grit having a size capable of passing through a screen on the order of 60 to 80 mesh. The grit blasted surfaces have been illustrated on the drawings by stippling. Although it is preferred that all surfaces of the elements which are contacted by the heated and plasticized thermoplastic material be so roughened, satisfactory results have been obtained when only the elements adjacent the orifice 74 have been so roughened, namely the end portions of the auxiliary mandrel element 80 and the outlet block 67 adjacent the orifice.

Although grit blasting using coarser grits have been tried, it has been found that a grit blast using 40 grit material provides too rough a surface as particles of the colorant material tend to adhere to portions of the roughened surface thereby causing streaking. Preferably, the surface should be grit blasted with a 60 to 80 mesh grit.

In conducting comparative tests, plasticized polyethylene having copper colored pigment therein was fed through (1) an orifice or extrusion die head structure having portions grit blasted in accordance with the foregoing description and (2) through an orifice structure formed with highly polished, chrome-plated passageways as in the prior art. Plastic bottles formed from tubing extruded through the second orifice structure were quite streaked as a result of non-uniform dispersion of the metallic pigment. In contrast, bottles formed from tubing extruded through the first orifice structure were quite uniform in appearance. Upon disassembly of the respective orifice structures, it could readily be seen that minute particles of the colorant pigment were adhered to the polished chrome-plated surface of the latter structure while the former structure had very little pigment adhered to the walls thereof.

In addition to being particularly useful in the forming of containers having metallic pigments, the present invention is also quite useful in forming containers having synthetic pearlescent pigment such as that manufactured and sold by Rona Pearl Corporation, Bayonne, N.J. Furthermore, orifice structures formed in accordance with the present invention can also be utilized in extruding and forming articles from non-colored plasticized material or with plasticized material colored with other types of pigment.

Although the present invention has been described in combination with an orifice structure as described in U.S. Pat. No. 3,090,994, it should be recogized that it could be utilized with virtually any orifice structure or extrusion die head. Although its use to date has been primarily with polyethylene and polyvinyl chloride, there is reason to believe it will be useful with other thermoplastic materials.

Several modifications will become readily apparent to those skilled in the art. Accordingly, the scope of the present invention should be measured by the scope of the claims appended hereto.

I claim:
1. The method of forming a plastic article comprising the steps of supplying a mass of melted and plasticized thermoplastic material having colorant pigment selected from the group consisting of metallic pigments and pearlescent pigments, said mass being shaped within the confines of a supply chamber, contacting the shaped mass with roughened die walls adjacent an extrusion die orifice, the roughening provided by grit blasting said walls with a grit between 60 and 80 mesh, maintaining a uniform dispersion of said pigment by said contact, removing the plasticized material from the die orifice, and setting said material while maintaining the desired uniform pigment dispersion.

2. The method of forming a plastic article comprising the steps of supplying a mass of melted and plasticized thermoplastic material having colorant pigment selected from the group consisting of metallic pigments and pearlescent pigments, said mass being shaped within the confines of a supply chamber, contacting the shaped mass with roughened die walls adjacent an extrusion die orifice, the roughening provided by grit blasting said walls with a grit between 60 and 80 mesh, maintaining a uniform dispersion of said pigment by said contact, extruding the plasticized material from the die orifice in tubular form, and expanding the tubular formation into a hollow article.

References Cited
UNITED STATES PATENTS

| | | | |
|---|---|---|---|
| 1,951,233 | 3/1934 | Binkley | 51—309.1 |
| 2,519,375 | 8/1950 | Jargstorff et al. | 18—14 |
| 2,708,772 | 5/1955 | Moncrieff | 264—209 |
| 2,814,071 | 11/1957 | Allan et al. | 264—209 |
| 2,947,124 | 8/1960 | Madigan et al. | 51—282 |
| 3,090,994 | 5/1963 | Stenger | 264—98 |
| 3,294,882 | 12/1966 | Lutzmann et al. | 264—95 |

ROBERT F. WHITE, Primary Examiner

J. R. THURLOW, Assistant Examiner

U.S. Cl. X.R.

18—14; 51—309.1; 264—98, 109, 176, 209